(No Model.) 3 Sheets—Sheet 1.

E. E. QUIMBY.
CONTINUOUS FILTER FOR PURIFYING SUGAR LIQUORS BY BONE BLACK.

No. 335,622. Patented Feb. 9, 1886.

Witnesses:
R. C. Howes.
M. L. Adams.

Inventor:
Edw. E. Quimby.

(No Model.) 3 Sheets—Sheet 2.

E. E. QUIMBY.

CONTINUOUS FILTER FOR PURIFYING SUGAR LIQUORS BY BONE BLACK.

No. 335,622. Patented Feb. 9, 1886.

(No Model.)

E. E. QUIMBY.

CONTINUOUS FILTER FOR PURIFYING SUGAR LIQUORS BY BONE BLACK.

No. 335,622. Patented Feb. 9, 1886.

UNITED STATES PATENT OFFICE.

EDWARD E. QUIMBY, OF ORANGE, ASSIGNOR TO THE F. O. MATTHIESSEN & WIECHERS SUGAR REFINING COMPANY, OF JERSEY CITY, N. J.

CONTINUOUS FILTER FOR PURIFYING SUGAR-LIQUORS BY BONE-BLACK.

SPECIFICATION forming part of Letters Patent No. 335,622, dated February 9, 1886.

Application filed October 26, 1885. Serial No. 180,892. (No model.)

*To all whom it may concern:*

Be it known that I, EDWARD E. QUIMBY, of Orange, New Jersey, have invented a certain Improvement in Continuous Filters, of which the following is a specification.

In continuous filters for purifying sugar-liquors by the process of upward filtration through bone-black, the bone-black at the bottom of the filtering-chamber requires to be gradually removed as it becomes "exhausted," or, in other words, as it becomes charged with impurities and loses its decolorizing power. To effect the uniform discharge of bone-black from all parts of the column of bone-black contained in the filtering-chamber, the discharging instrumentality must be capable of acting over the entire area of the bottom of the column. For effecting this object there has heretofore been devised, for employment at the bottom of the filtering-chamber, a reciprocating grate provided with grate-bars in the form of troughs, made to rotate upon their longitudinal axes in opposite directions during the to-and-fro excursions, respectively, of the reciprocating grate, as described in the pending application of F. O. Matthiessen, serially numbered 178,789, filed October 2, 1885.

The present invention consists in the combination, with the filtering-chamber and the receiving-chamber beneath the filtering-chamber, of a horizontal grate which constitutes the bottom of the filtering-chamber, and which is composed of grate-bars rocking in stationary bearings, and of such shape and having such range of rocking movement as to progressively remove the support from all parts of the bottom of the column of bone-black during each of their rocking movements.

Figure 1:
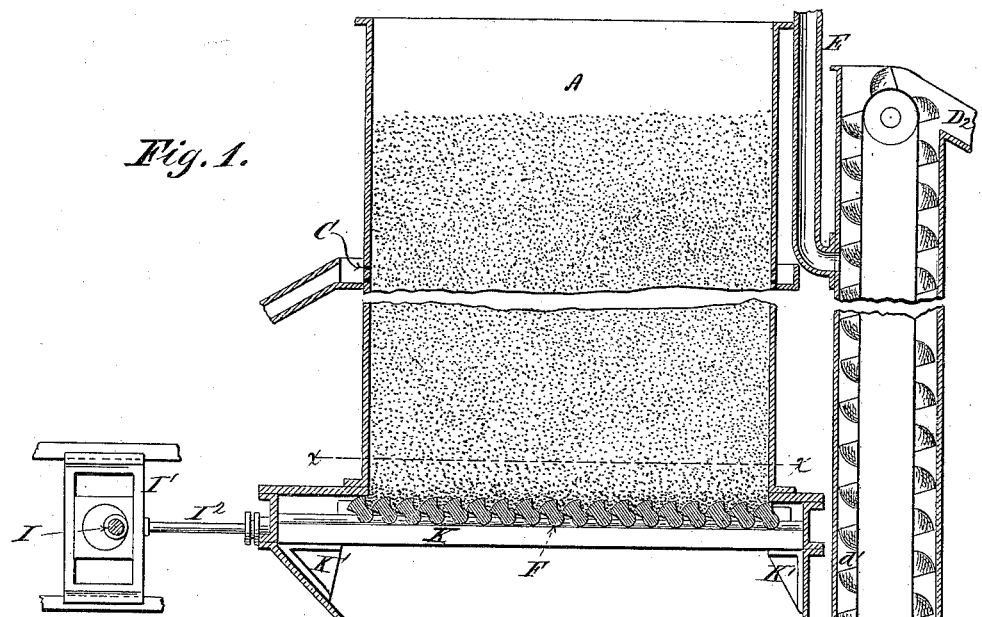
Figure 2:
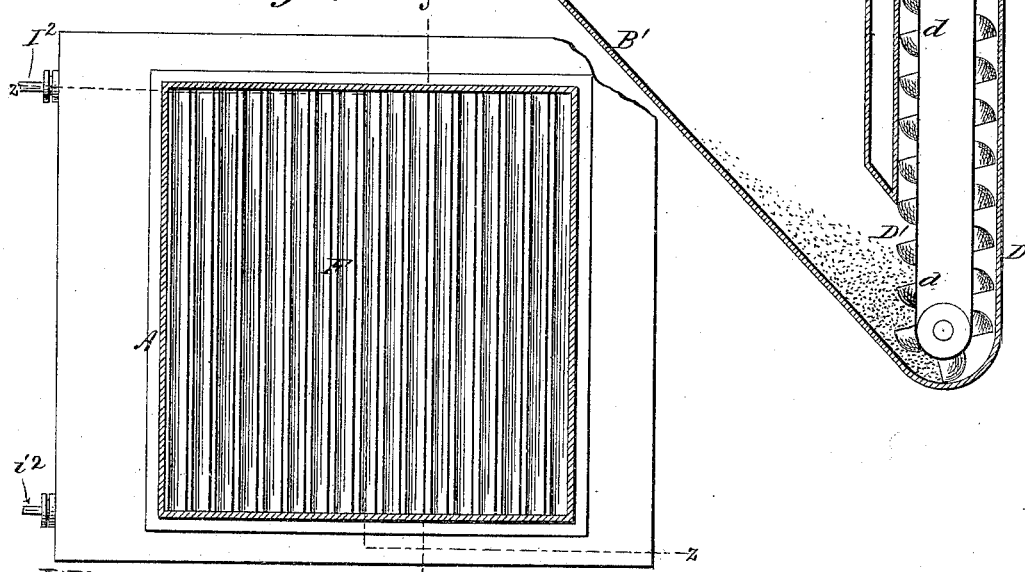
Figure 3:
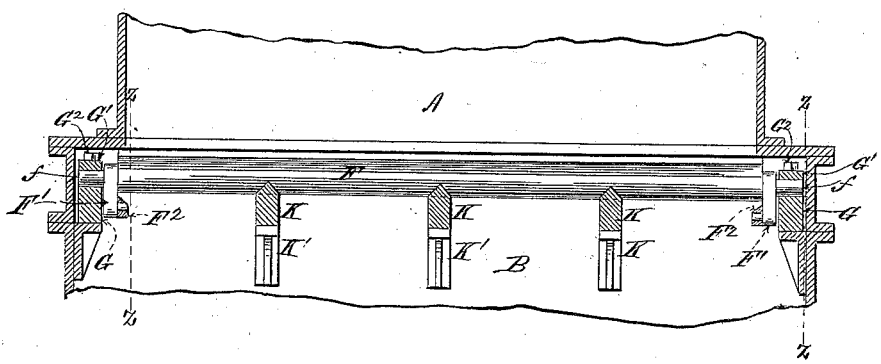
Figure 4:
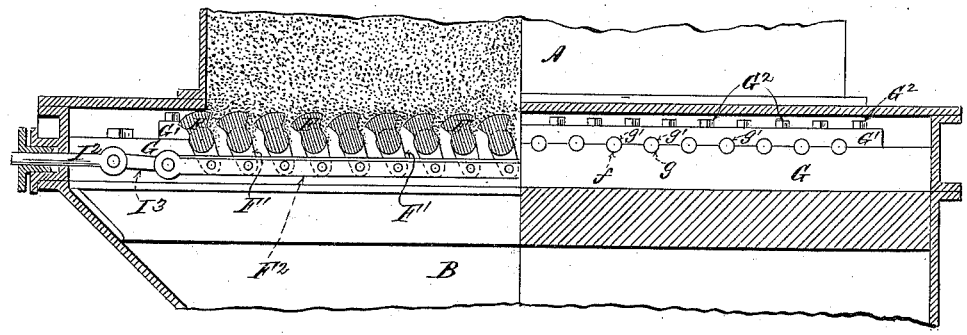
Figure 5:
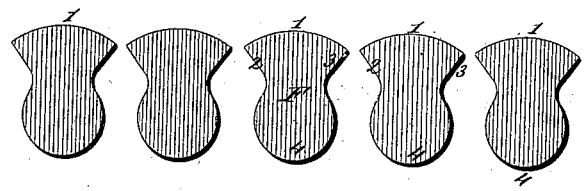
Figure 6:
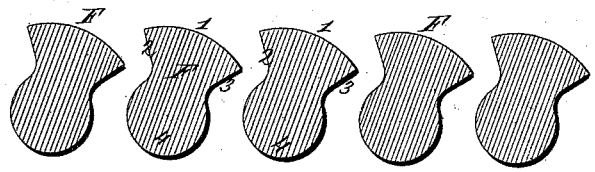
Figure 7:
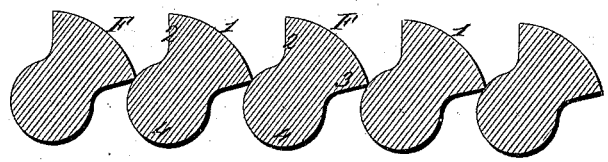

Figure 1 is a central vertical section of a continuous filter for effecting the purification of sugar-liquor by the process of upward filtration through bone-black provided with this improvement, and showing the rocking grate-bars in the positions in which they are brought to rest at the end of their backward motions. Fig. 2 is a horizontal section through the line $x\ x$ on Fig. 1, affording the top view of the grate. Fig. 3 is a vertical section through the line $y\ y$ on Fig. 2, showing one of the grate-bars in side elevation, and showing the bearings for its trunnions in the two parallel horizontal girders which constitute the grate-frame. Fig. 4 is a vertical section through the offset line $z\ z$ on Fig. 2, affording a side elevation of one of the girders in which the trunnions of the grate-bars have their bearings, showing the positions which they occupy after they have completed about one-quarter of their forward movement. Fig. 5 is a transverse vertical section of several adjoining grate-bars, showing them in the positions which they occupy after having completed one-half of their rocking motion in either direction. Fig. 6 is a similar section showing the positions which the grate-bars occupy when they have completed about three-quarters of their forward rocking movement, and Fig. 7 is a similar section showing the positions in which the grate-bars are brought to rest at the conclusion of their forward motion.

In the type of filtering apparatus to which this invention relates a filtering-chamber, A, surmounts a receiving-chamber, B. The sugar-liquor to be purified is introduced into the receiving-chamber under sufficient head to enable it to make its way upward through the column of bone-black in the filtering-chamber to the outlets C, through which it is discharged. From time to time, as may be required, quantities of exhausted bone-black are removed from the bottom of the filtering-chamber into the receiving-chamber, and like quantities of fresh bone-black are fed into the top of the filtering-chamber. Provision is made for the removal of the exhausted bone-black from the receiving-chamber without interrupting the continued upward flow of the sugar-liquor in the filtering-chamber. These are the typical characteristics of various forms of apparatus which belong to the class of so-called "continuous filters."

Fig. 1 of the drawings shows one of the well-known methods of removing the exhausted bone-black from the receiving-chamber. This consists of a tube or well, D, provided with a chain-and-bucket elevator, $d$. The exhausted bone-black flows down the inclined bottom B' of the receiving-chamber into the bottom D' of the well, and is elevated therefrom by being caught in the buckets d', which are made of wire-gauze, or are perforated, so that the sugar-liquor may be to some extent drained out of them before they reach the top of the well, at which point their contents are discharged upon the chute D². The sugar-liquor to be purified is introduced into the upper part of the well through the service-pipe E, which is connected with a suitable reservoir.

The bottom of the filtering-chamber consists of a series of equidistant horizontal grate-bars, F F, &c. Each grate-bar is provided at its opposite ends with a trunnion, f, bearings for which are provided, respectively, in two horizontal girders, G, which are fastened in any convenient way in the upper part of the receiving-chamber B, upon opposite sides thereof. Equidistant semi-cylindrical grooves g are formed transversely across the top of the girder G, and similar semi-cylindrical grooves, g', are formed transversely across the bottom of the cap-piece G', which is bolted to the top of the girder G by means of the screw-bolts G². The spaces between the semi-cylindrical grooves g and g', respectively, constitute the bearings for the trunnions f of the grate-bars. The grate-bars are provided at both ends with the downwardly-projecting crank-arms F' F', &c., and the crank-arms on each side are pivoted to the horizontal connecting-rods F² F², respectively.

Motion to rock the grate-bars may be transmitted from eccentrics on the horizontal crank-shaft I to horizontally-sliding carriages, one of which, I', is shown in Fig. 1, to which carriages the upper ends of the slide-rods I² I² are respectively connected. The slide-rods extend through suitably-packed bearings, I³, in the wall of the receiving-chamber, and upon their inner ends are connected by links—one of which, I⁴, is shown in Fig. 4—to the ends of the connecting-rods F² F², respectively. Power to rotate the shaft I, for the purpose of rocking the grate-bars, is applied by means of gearing, or in any other convenient way.

It will be seen that the grate-bars may be rocked into positions in which they entirely close the bottom of the filtering-chamber, or into other positions in which the spaces between them are so widened as to permit the bone-black to fall from the filtering-chamber through the grate into the receiving-chamber. It will of course be understood that this capacity of operation is common to many systems of grate-bars, respectively, of different forms in cross-section. Thus it will be possessed by flat slats arranged in relation to each other like the slats of a Venetian blind, so that one edge of each slat overlaps the edge of the slat adjoining it on one side, and its other edge underlaps the edge of the slat adjoining it on the other side. As the entire weight of the column of bone-black contained in the filtering-chamber rests upon the grate, it will be obvious that considerable power would be required to rock such slats from their more nearly horizontal positions toward their more nearly vertical positions.

It is a specific feature of the present improvement that the grate-bars are so shaped in cross-section that in rocking them in either direction they do not exert any lifting effect upon the superincumbent bone-black, and they are therefore more easily rocked.

As will be seen on reference to the drawings, the uppermost surface of each grate-bar is formed into the convex surface 1, which is concentric with the axis upon which the grate-bar oscillates. The opposite edges of the convex surface 1 form acute angles with the sides 2 and 3, respectively. The sides 2 and 3 extend radially a short distance toward the axis of the grate-bar, and then curve outwardly and terminate upon the surface of the cylindrical portion 4 of the grate-bar.

The grate-bars are so proportioned and the distances between their axes so arranged that when either bar has completed its rocking movement in one direction, as shown in Fig. 7, the flat portion of its side 2 occupies a vertical position in the plane of its axis, and the acute angle formed by the junction of its side 3 with the edge of the convex surface 1 is brought to rest so near the concentric surface of the cylinder 4 of the grate-bar next adjoining it as to prevent the bone-black from falling through between the bars.

When either grate-bar has, as illustrated in Fig. 1, completed its rocking movement in the opposite direction, the flat portion of its side 3 is brought into a vertical position in the plane of its axis, and the acute angle formed by the union of its side 3 with the edge of its convex surface 1 is brought near enough to the surface of the cylinder 4 of the grate-bar next adjoining it on the opposite side to prevent the bone-black from falling through between the bars.

It results from the proportions and range of oscillatory motion of grate-bars that in swinging in either direction they successively uncover all portions of the bottom of the column of superincumbent bone-black, and thus open a path for the discharge of the entire lower stratum of the column.

When the dimensions of the filtering-chamber require it, the grate-bars are provided, respectively, with intermediate supports in semicircular grooves formed transversely in the tops of the intermediate horizontal girders, K K K, which are supported at their opposite ends, respectively, upon brackets K' K', &c., bolted to the walls of the receiving-chamber. The intermediate girders, K K K, are rounded or beveled at the top, in order that there may be no lodgment upon them of the bone-black which falls from the filtering-chamber.

What is claimed as the invention is—

1. In a continuous filter for purifying sugar-liquor by the process of upward filtration through bone-black, the combination, as herein set forth, of the filtering-chamber A, provided at the bottom with a series of horizontal rocking grate-bars mounted in bearings formed in a stationary frame, or in stationary girders, means for imparting to the grate-bars a sufficient range of rocking movement to enable them, during their oscillation in either direction, to progressively remove the support from all parts of the bottom of the column of bone-black in the filtering-chamber, a receiving-chamber beneath the filtering-chamber, means for removing the exhausted bone-black from the receiving-chamber, and means for introducing into the receiving-chamber the sugar-liquor which is to be purified, under sufficient head to enable it to make its way upward through the column of bone-black contained in the filtering-chamber to the level of the outlets through which it is discharged from the filtering-chamber.

2. The combination of the filtering-chamber A and the receiving-chamber B with the grate composed of the horizontal rocking grate-bars F F, &c., each of the upper edges of each of which grate-bars is, at the conclusion of the rocking motion of the bar in one direction, carried against the grate-bar which adjoins it, and at the conclusion of the rocking motion in the other direction is brought to rest in the vertical plane of its axis of oscillation.

3. The combination, as herein set forth, of the filtering-chamber A, the receiving-chamber B, the system of horizontal grate-bars F F, &c., pivoted in stationary bearings, one or more connecting-rods, $F^2$, linked, respectively, to one or more horizontal slide-rods provided with suitable bearings in the side wall of the receiving-chamber, and means for applying power to the said slide-rods for the purpose of imparting a rocking motion to the grate-bars.

4. The combination of the filtering-chamber A and the receiving-chamber B with the system of horizontal rocking grate-bars F F, &c., journaled at their ends in stationary bearings, and also supported in one or more half-bearings formed in one or more intermediate girders, K K, &c., as and for the purpose set forth.

5. The intermediate transversely-grooved horizontal girders, K K, rounded or beveled at the top, in combination with the system of rocking grate-bars F F, &c., the filtering-chamber A, and the receiving-chamber B.

EDW. E. QUIMBY.

Witnesses:
M. L. ADAMS,
R. C. HOWES.